United States Patent
Liebmann et al.

(10) Patent No.: US 9,929,991 B2
(45) Date of Patent: *Mar. 27, 2018

(54) JUST-IN-TIME, EMAIL EMBEDDED URL REPUTATION DETERMINATION

(71) Applicant: McAfee, Inc., Santa Clara, CA (US)

(72) Inventors: Nicholas Liebmann, Watford (GB); Martin Stecher, Paderborn (DE); Paul Gartside, Newport Pagnell (GB); Michael G. Bishop, Thame (GB); Simon Hunt, Naples, FL (US)

(73) Assignee: McAfee, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/267,658

(22) Filed: Sep. 16, 2016

(65) Prior Publication Data

US 2017/0005961 A1 Jan. 5, 2017

Related U.S. Application Data

(63) Continuation of application No. 13/721,303, filed on Dec. 20, 2012, now Pat. No. 9,467,410.

(51) Int. Cl.
*H04L 12/58* (2006.01)
*H04L 29/08* (2006.01)

(52) U.S. Cl.
CPC .............. *H04L 51/08* (2013.01); *H04L 51/12* (2013.01); *H04L 51/18* (2013.01); *H04L 67/02* (2013.01)

(58) Field of Classification Search
CPC ....... H04L 63/08; H04L 63/102; H04L 63/10; H04L 63/107; H04L 12/58; H04L 51/12; H04W 4/02; H04W 4/023; H04W 4/0231; H04W 12/08; H04W 12/06; H04W 72/08; H04W 64/00; G06F 21/6218
USPC ......................................................... 709/206
See application file for complete search history.

(56) References Cited

U.S. PATENT DOCUMENTS

| | | |
|---|---|---|
| 2005/0050222 A1 | 3/2005 | Packer |
| 2006/0101334 A1 | 5/2006 | Liao et al. |
| 2008/0022013 A1 | 1/2008 | Adelman et al. |
| 2009/0037469 A1 | 2/2009 | Kirsch |
| 2010/0228724 A1* | 9/2010 | Petri ................. G06F 17/30489 707/722 |
| 2010/0318623 A1 | 12/2010 | Bloch et al. |

(Continued)

FOREIGN PATENT DOCUMENTS

WO 2011-082437 A2 7/2011

OTHER PUBLICATIONS

International Search Report and Written Opinion regarding corresponding PCT application No. PCT/US2013/074715, dated Mar. 19, 2014.

(Continued)

*Primary Examiner* — Tu Nguyen
(74) *Attorney, Agent, or Firm* — Blank Rome, LLP

(57) ABSTRACT

A system allows just-in-time checking of information about an email in which a hyperlink is embedded. Upon receipt of the email containing the hyperlink, the resource locator of the hyperlink is modified to allow checking the reputation of the email upon traversal of the hyperlink. At traversal of the hyperlink, the current reputation of the resource locator and the current reputation of the email are both determined, and one or more actions are performed responsive to the determination.

20 Claims, 7 Drawing Sheets

(56) References Cited

U.S. PATENT DOCUMENTS

2011/0167492 A1 7/2011 Ghosh et al.
2012/0151578 A1 6/2012 Niemela
2012/0297031 A1* 11/2012 Danielsson Fan .. G06F 21/6263
    709/219

OTHER PUBLICATIONS

Extended International Search Report and Written Opinion regarding corresponding PCT application No. PCT/US2013/074715, dated Aug. 23, 2016.

* cited by examiner

JUST-IN-TIME, EMAIL EMBEDDED URL REPUTATION DETERMINATION

BACKGROUND

This disclosure relates generally to the field of malware detection. More particularly, but not by way of limitation, it relates to techniques for using reputation for determining whether to allow traversal of a hyperlink embedded in an email.

Anti-malware systems have provided email gateways to perform checks on email before delivery to an email client and web gateways to perform checks on Uniform Resource Locators (URLs) before allowing traversal of a hyperlink. Such checks often consider a reputation of the email or the URL. Reputation is a concept used to determine the validity of an email or a URL based on information collected from global sources. The reputation of an email or a URL is not fixed, and can change over time based on data collected from global sources. A weakness exists in current anti-malware systems that may allow a phishing or otherwise unwanted email through to a recipient because the services used by the email gateway to determine email reputation does not yet have enough knowledge of a particular host or content. The email recipient may then click on a hyperlink within the message, but the hyperlink alone does not have enough reputation information associated with it to prevent traversal of the hyperlink.

DETAILED DESCRIPTION

Figure 1:
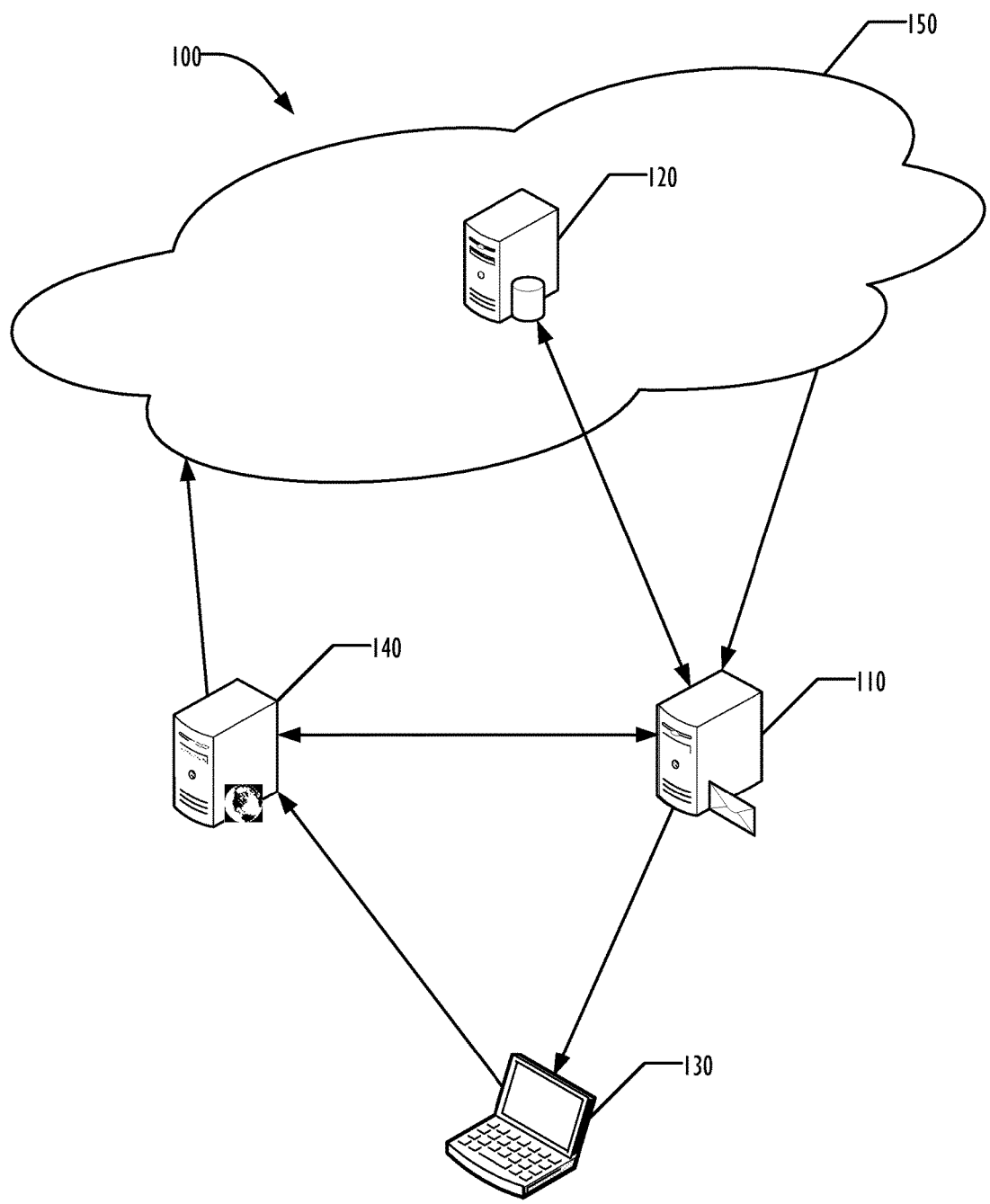
FIG. 1 is a block diagram illustrating a system for performing just-in-time email embedded URL reputation determinations according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by a computer system.

As used herein, the term "hyperlink" refers to information that can be used to access a resource, which may be either a remote resource, such as a website, or a local resource, such as a file in a filesystem or a location in a current document. The hyperlink includes a resource locator that identifies the resource to be accessed. Although generally described herein as a Uniform Resource Locator (URL), the resource locator may be any information useful for identifying the resource, including parameters or options to be applied by the resource to an access request. As used herein, traversing the hyperlink or traversing the resource locator refers to an attempt to access the resource pointed to by the URL specified in the hyperlink by sending a web request containing the URL to a web server using a protocol such as HyperText Transport Protocol (HTTP) or HyperText Transport Protocol Secure (HTTPS), allowing the web server to respond to the web request based on the information in the URL.

Various embodiments described in detail below allow additional context to be associated with a hyperlink contained in an email to allow determination of the reputation of the email at the time that traversal of the hyperlink is attempted. Because that traversal typically occurs sometime after the original scan of the email, the time lapse between the original scan and the user attempting to traverse the hyperlink may provide time for services accessed by the email gateway or other parts of the systems described herein to have learned more about to the email and thus to give a more accurate reputation determination.

By encoding information into URLs in an email, the encoded information may be extracted and used to request the current reputation of the original email and incorporate that reputation and any judgments made about the URL at the time of traversal. This allows, therefore, a just-in-time reputation check in real time using the embedded information.

FIG. 1 is a block diagram illustrating one embodiment of a system 100 for performing just-in-time email embedded URL reputation determinations. An email gateway 110 receives email addressed to a recipient using client 130. The email gateway 110 may receive email using any desired technique known to the art. The email gateway 110 may perform a reputation check on the email, in this example using the services of a reputation server 120.

To do this initial email reputation check, the email gateway 110 upon receiving the email may extract sufficient information for email reputation determination, such as data signatures, header data, and envelope data. The information may include the email itself, or parts of the email. The information may also include information about a connection over which the email was received, such as the IP address of a server sending the email.

Although illustrated in FIG. 1 as a single reputation server 120 providing services in the cloud, the reputation server 120 may be a local reputation server, which may in turn access services of one or more other reputation servers, including a global reputation server such as provided by the Global Threat Intelligence system of McAfee, Inc. Reputation information may be provided to the email gateway 110 in any desired form, using any desired protocol for communicating the reputation information. In one example, a reputation score may be provided by the reputation server 120. As illustrated in FIG. 1, the reputation server 120 is located in the cloud 150, and may be anywhere reachable from the email gateway 110.

Upon receipt of the reputation information from the reputation server 120, the email gateway 110 may choose to deliver the email to the client 130, block the email from delivery, or take any other desired action. If the email is to be delivered to the client 130, the email gateway 110 may further analyze the content of the email to determine whether the email contains a hyperlink. If a hyperlink is detected, the email gateway modifies the resource locator of the hyperlink to include information to identify the email message. The identification information typically includes a message identifier, such as contained in a Message-ID header of the email, but may be any information sufficient to allow a later determination that the URL was originally embedded in an email and to identify the email uniquely. The identification information is inserted into the hyperlink for later use upon traversal of the hyperlink. The URL remains usable as a resource locator, so that a user may click on the hyperlink containing the URL to traverse it in the usual way. Where the hyperlink has an associated hyperlink text data, the modifications to the URL may not be immediately visible in the email.

Other information may be encoded into the URL as desired, such as context information associated with the email. For example, verification information may be encoded into the URL to allow the web gateway or other portions of the system 100 that obtain the URL to determine that the encoding was produced by the email gateway 110. In addition, the encoded information inserted into the URL may be encrypted, to prevent unauthorized decoding of the identification information, to allow detection of unauthorized insertion or modification of the encoded information.

The email gateway may also generate meta-information corresponding to the email, storing the meta-information in a local or remote database, keyed by the message identifier. The meta-information is preserved for later use when determining the reputation of the email at the time of traversing the hyperlink. The meta-information may include one or more of a data signature, such as a hash of the email, header data of the email, and envelope data of the email. Other meta-information may be preserved as desired, including the entire original email and all of the connection/protocol information.

After modifying the URL in the email, the email gateway may deliver the email to the mailbox of the recipient (in FIG. 1, a user of client 130) using any desired technique for email delivery. Delivery may involve delivery of the email to a mailbox at a mail server, which is then accessed by client software on the client 130. However, delivery may also involve delivery of the email to the client 130 if desired. Some time later, when a user of the client 130 attempts to traverse the hyperlink, such as by clicking on the hyperlink in the email, email software initiates the traversal by sending a request for the URL. The traversal attempt may be intercepted by a web gateway 140, typically acting as proxy server for the client 130.

Upon receipt of the URL information from the client 130, the web gateway 140 may analyze the URL and determine that the URL was originally embedded in an email as a hyperlink. The web gateway 140 may choose whether to allow the traversal of the hyperlink using any desired technique, including requesting reputation information for the URL from a reputation server such as the reputation server 120. If the URL was not embedded in an email, then the web gateway 140 may act on that decision as desired. Where the URL was embedded in an email, this reputation check of the URL may be delayed, as described below.

However, if the URL is determined to have been embedded in an email, the web gateway 140 may also pass the identification information extracted from the URL to the email gateway 110, using any desired communication technique. The email gateway 110 may then reexamine the reputation of the email itself, obtaining reputation information from the reputation server 120 as before, but now obtaining possibly updated reputation information that was developed in the interim between the original analysis of the email message and the hyperlink traversal attempt.

Where the email gateway stored meta-information about the email in its initial processing of the email, that meta-information may be extracted based on the identification information provided by the web gateway 140 and used to obtain the current reputation of the email.

That updated email reputation information may then be provided to the web gateway 140, allowing the web gateway 140 to use both the current reputation of the URL and the current reputation of the email in which it was embedded to decide whether to allow the traversal of the hyperlink. The email reputation information may be requested and obtained either before, after, or concurrently with obtaining the reputation information for the URL itself.

The result is that the web gateway 140 is capable of taking any desired action, including subjecting the URL to greater scrutiny, blocking the URL, or redirection of the traversal to an alternate site, based not just on the reputation of the URL, but the current reputation of the email in which the hyperlink with that URL was embedded.

If the URL is allowed to pass the web gateway, the gateway may also apply different filtering policies to the data that is returned from the web server and again traverses the web gateway. Depending on whether the requesting URL was contained in an email and the reputation of that email, a different set of content filters with different settings may be applied. For example, a heuristic antimalware scanner may be turned into its highest detection mode if the reputation of the email indicates the email is a spam message.

The system of FIG. 1 is illustrative and by way of example only, and variations on the system illustrated therein may be used. For example, the email gateway 110 may provide its own reputation service function, instead of using the services of the reputation server 120. In such a system, the email gateway 110 upon extracting sufficient information for email reputation determination may record the information extracted from the email in a database (not shown in FIG. 1), keyed by the identification information inserted into the URL. Upon receipt of the communication from the web gateway 140, instead of querying a reputation server 120, the email gateway 110 may use the message identifier as a key for querying the database, allowing the email gateway 110 to generate the reputation information from the information in the database.

Even where the email gateway 110 uses the services of a remote reputation server 120, the email gateway 110 may store information about the email in a database that can then be passed to the reputation server 120 upon receipt of the request from the web gateway 140.

Figure 2:
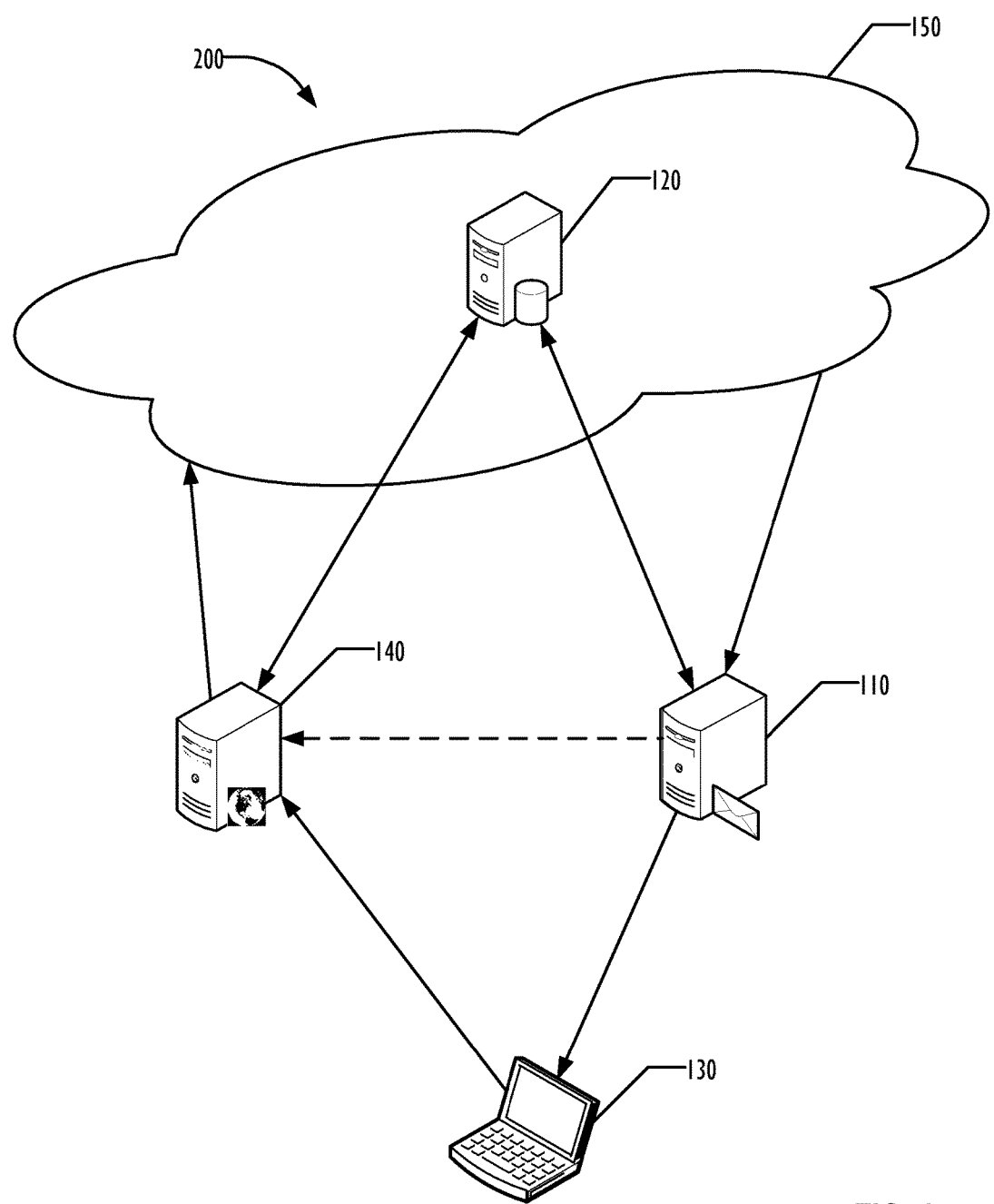
FIG. 2 is a block diagram illustrating a system for performing just-in-time email embedded URL reputation determinations according to another embodiment.

FIG. 2 is a block diagram illustrating another embodiment of a system 200 for just-in-time email and URL reputation determination that is a variant of the system described above. In the system illustrated in FIG. 2, instead of the email gateway 110 storing information about the email message for later retrieval and use in determining the reputation of the email upon hyperlink traversal, the email gateway 110 may communicate that information in the email message itself, such as by a further modification of the URL, or as indicated by the dashed line, communicate that information to the web gateway 140, which may store the information for use when requesting reputation information from the reputation server 120. In such variants, the web gateway 140 need not be capable of requesting reputation information from the email gateway 110. If the web gateway 140 maintains a database (not shown) of information about the emails processed by the email gateway 110, it may use that information to perform its own reputation determination instead of querying the reputation server 120. Alternately, the web gateway 140 may obtain the information from the database and use it for querying the reputation server 120 to obtain the current reputation of the email. As before, the web gateway 140 may then use the current reputation of both the URL and the email to determine what actions to take in response to the hyperlink traversal.

Figure 3:
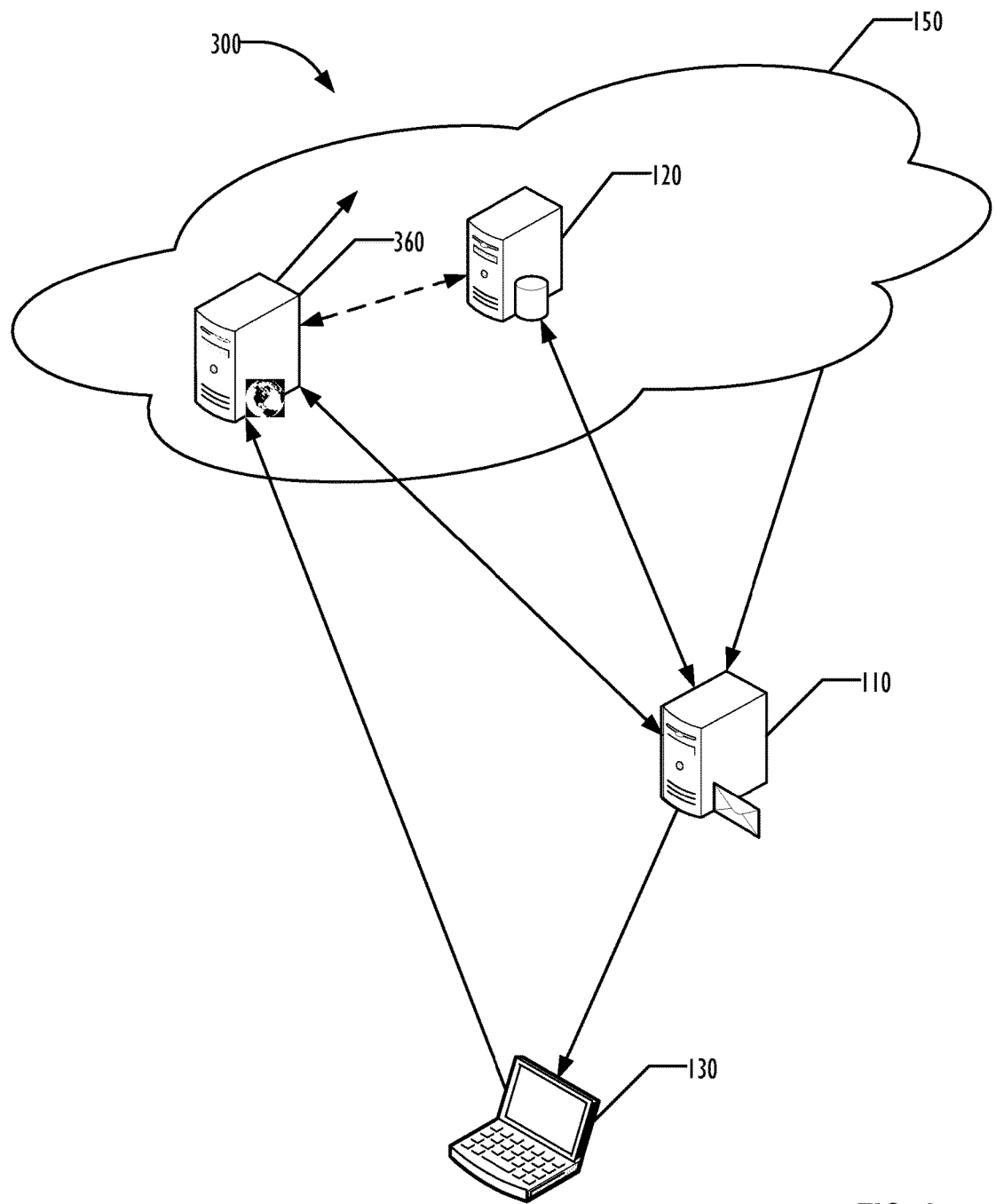
FIG. 3 is a block diagram illustrating a system for performing just-in-time email embedded URL reputation determinations according to yet another embodiment.

FIG. 3 is a block diagram illustrating yet another embodiment of a system 300 for just-in-time email and URL reputation determination that is a variant of the system described above. In this variant, the email gateway 110 may replace the URL in the hyperlink with a replacement URL that points to a URL shortening service 360. The URL shortening service 360 is a redirection server so that traversing a replacement URL causes redirection of the traversal to the destination of the original URL embedded in the email upon receipt by the email gateway 110. Although referred to as a shortening service, because the replacement URL is typically encoded as a short URL (e.g., http://macaf.ee/x4q53fly); however, the replacement URL may be any desired length, including longer than the original URL, and may include URL query parameters as desired.

The email gateway 110 also provides to the shortening service 360 information about the original URL and sufficient information (such as the information described above) to allow the shortening service 360 both to redirect the traversal to the original URL location and to perform the reputation checking, either by querying a local database of reputation information, or by requesting reputation information for one or both of the email and the URL from the reputation server 120. In such a system, the shortening service typically maintains a database of information provided to it by the email gateway 110. The email gateway typically provides the URL to the shortening service 360, which returns a shortened URL to the email gateway 110, which replaces the original URL with the shortened URL. The shortening service 360 maintains an association between the original and shortened URL in the database, allowing it to redirect the traversal to the original desired destination. The other information received from the email gateway 110 for use in determining the email reputation may also be stored in the database. As with the previously-described embodiments, the system of FIG. 3 may allow or prohibit traversal of the hyperlink, or perform any other desired action, based on the reputation of the URL or the email in which it was embedded.

The email gateway 110, when it communicates with the shortening service 360, may also communicate any desired policy information, such as information to tell the shortening service 360 what action to take, information about customization of any error/warning messages (including applying branding), and information about whether to allow the user to see the original URL.

Although illustrated in FIGS. 1-3 as single computers, each element of the systems illustrated therein may be implemented using multiple computers, any of which may employ one or more processors.

Figure 4:
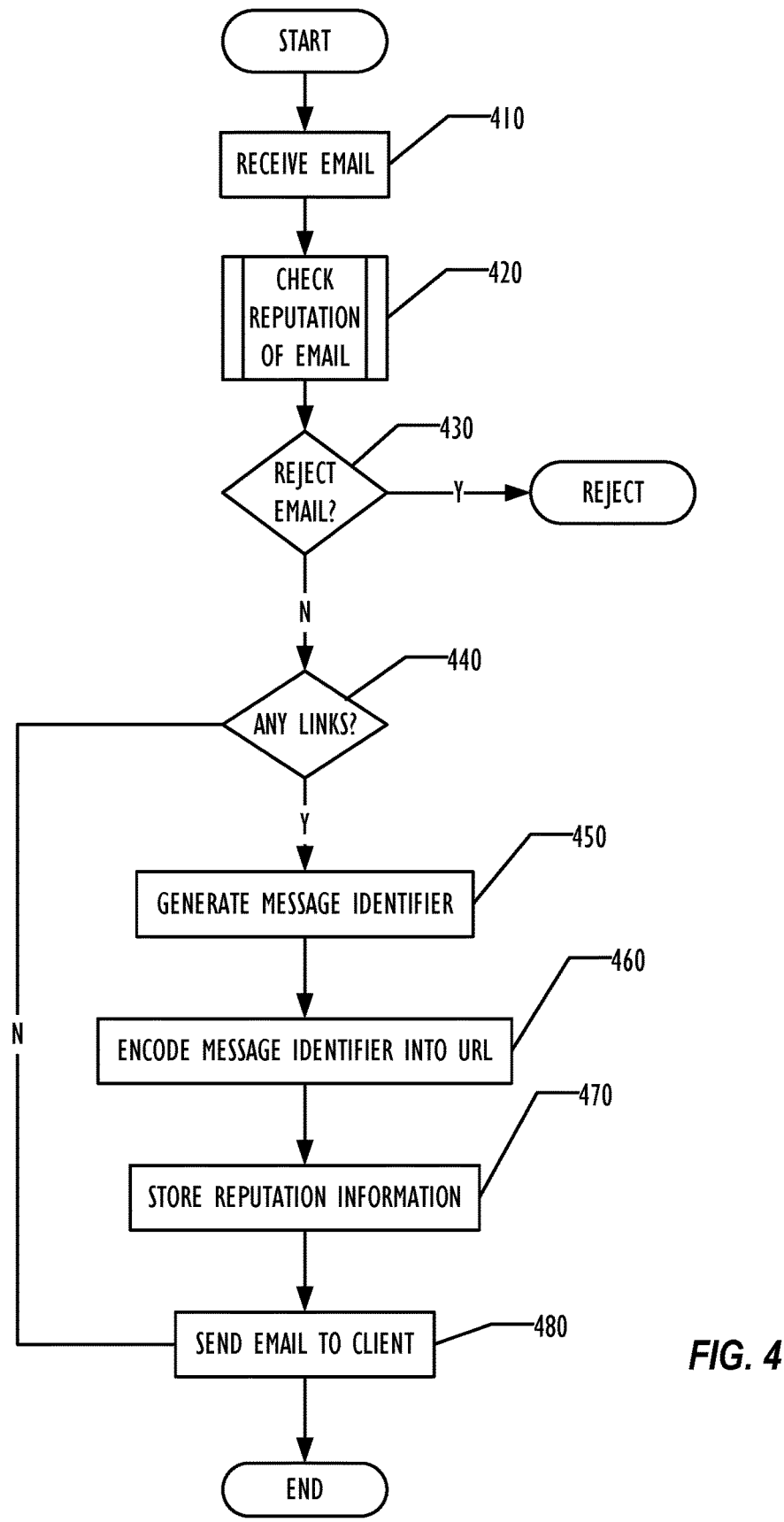
FIG. 4 is a flowchart illustrating a portion of a technique for performing just-in-time email embedded URL reputation determinations according to one embodiment.
Figure 5:
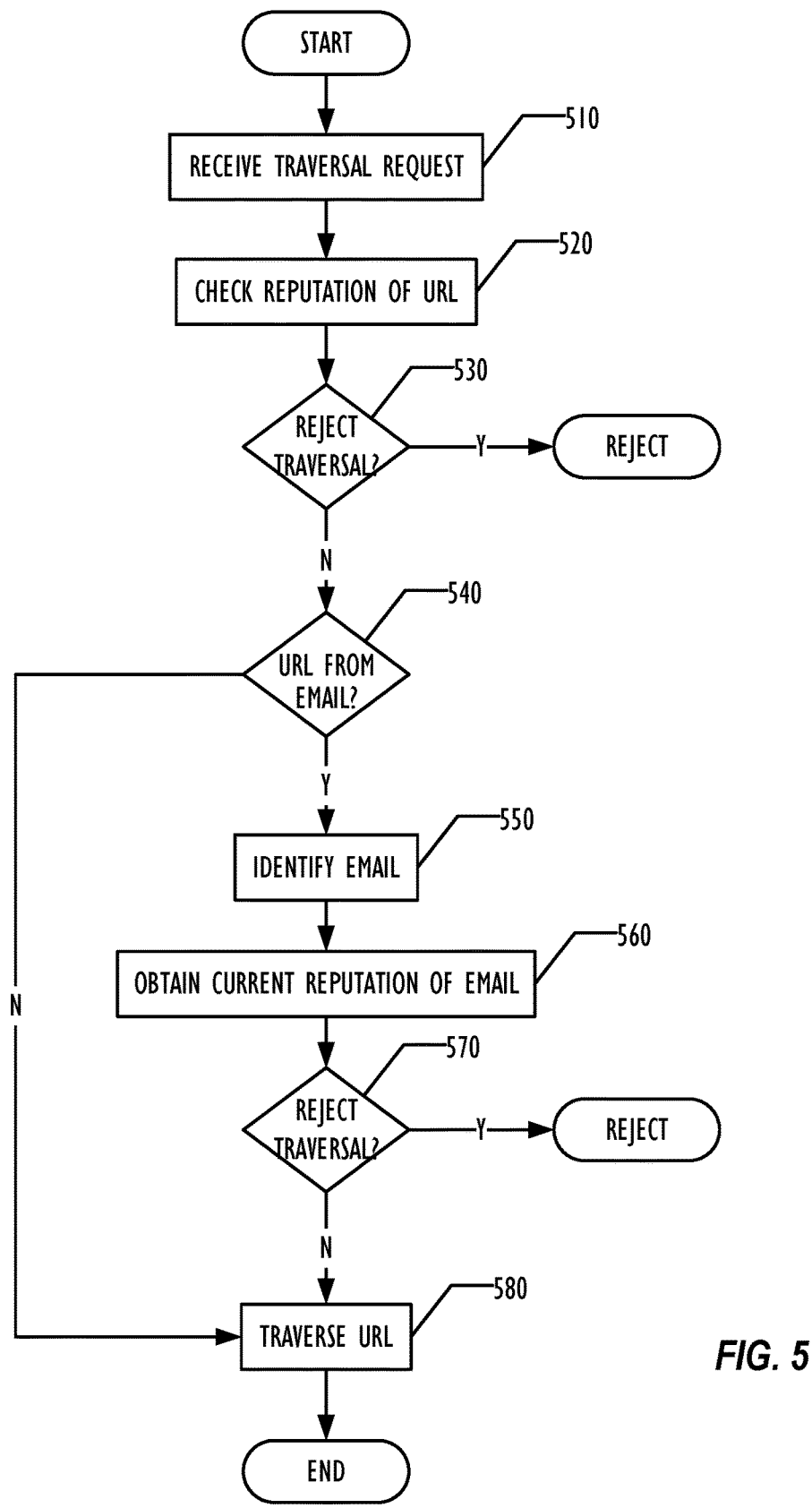
FIG. 5 is a flowchart illustrating a portion of a technique for performing just-in-time email embedded URL reputation determinations according to one embodiment.
Figure 6:
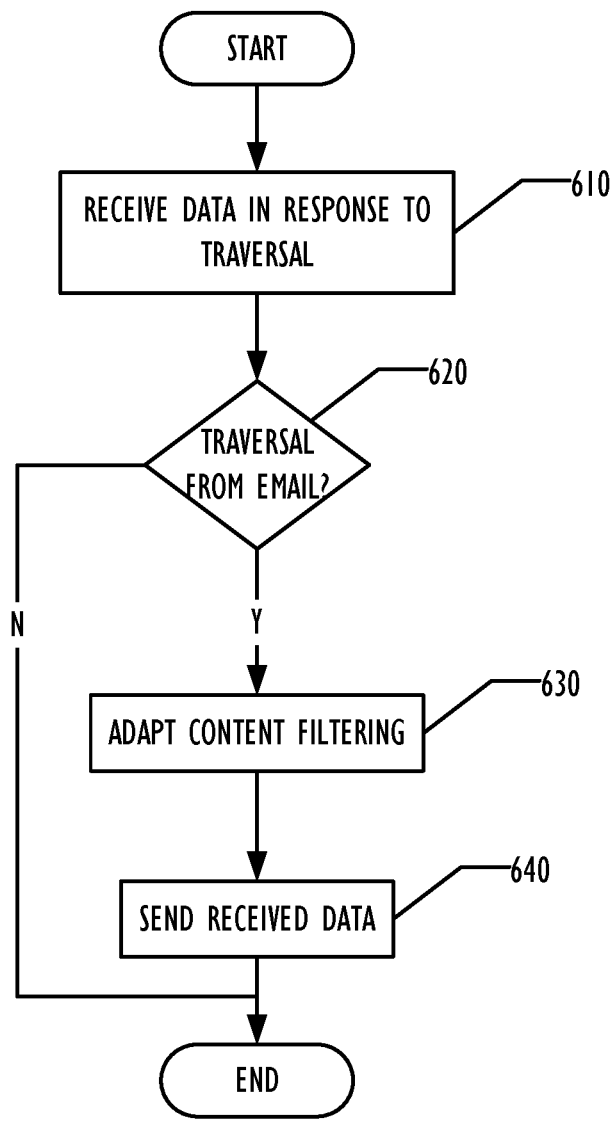
FIG. 6 is a flowchart illustrating a technique for performing adaptive content filtering based on just-in-time email embedded URL reputation determinations according to one embodiment.

FIGS. 4-6 are flowcharts illustrating portions of a technique for just-in-time email embedded URL reputation determination according to one embodiment. FIG. 4 illustrates a portion performed when the email is received. FIG. 5 illustrates a portion performed when the hyperlink containing that URL is traversed. FIG. 6 illustrates a portion performed when content is received as a result of the traversal.

In block 410, the email is received by the email gateway 110. The reputation of the email is checked in block 420, using any desired technique for establishing the reputation of the email, such as querying a local database or a remote reputation server, such as reputation server 120.

In block 430, if the reputation of the email indicates that the email should not be delivered to the client 130, the email gateway 110 may reject the email. Any other desired action based on the reputation of the email may be taken at this time in addition to or instead of rejecting the email.

In block 440, the email is analyzed by the email gateway 110 to determine whether it contains any hyperlinks. If there are no hyperlinks in the email, then the email may simply be sent to the client 130 in block 480. If a hyperlink is found in the email, then in block 450 a message identifier may be generated to uniquely identify the email. In block 460, the message identifier may be encoded into the URL included in the hyperlink before delivering the email to the client 130 in block 480.

In some implementations, to prevent malicious or inadvertent modification of the URL to falsely identify the email, the encoding may incorporate checksums or other types of security coding to allow the web gateway 140 or any other element of the system analyzing the URL to determine that a modification has been made. Any desired technique may be used to encode the message identifier securely.

In block 470, the email gateway 110 may store information for later use in determining the reputation of the email at the time of traversal of the hyperlink. As described above, this information may be stored in a local database or remotely. Alternately, as described above, the reputation information may be directly encoded into the URL itself.

Thus, when the email is sent to the client in block 480, the URL contains sufficient information to allow the web gateway 140 or other element of the system to identify and check the reputation of the email in which the URL was embedded at the time of traversal of the hyperlink, in addition to checking the reputation upon receipt of the email. Implementations could eliminate the reputation check of block 420-430 at time of receipt of the email, delaying the reputation check until traversal of the hyperlink occurs.

Although FIG. 4 illustrates processing of only a single hyperlink, blocks 440-460 may be repeated as many times as necessary to process all of the hyperlinks located in the email.

As described above, instead of modifying the URL originally received in the email, the URL may be replaced with an alternate URL that points to a redirection service such as provided by URL shortening service 360.

FIG. 5 illustrates processing of the URL at the time of traversal. In the discussion below, the technique is described in terms of the system of FIG. 1, but implementations of the systems of FIGS. 2-3 would perform similar steps. In block 510, the web gateway 140 receives the hyperlink traversal request, typically as a request to make a HyperText Transport Protocol (HTTP) or HyperText Transport Protocol Secure (HTTPS) connection to a location specified in the URL of the hyperlink. In block 520, the web gateway 140 may scan the URL and perform security checks, such as requesting a reputation for the URL from a reputation server 120. Any other desired type of security checking may be performed at this time, in addition to or as an alternate to reputation checking. If the result of the security checking indicates that the traversal should be rejected in block 530, then the request may be rejected. Alternately, other results may be returned by the web gateway 140, including sending messages or other responses to the client 130 making the request, that may cause display of information about the URL or the security check result.

If the traversal is allowable, then in block 540 the web gateway determines whether the hyperlink was embedded in an email, by looking for the encoded information added by the email gateway. If the hyperlink was not embedded in an email, then the conventional traversal of the hyperlink may be performed in block 580. If the URL was obtained from a hyperlink in an email, however, then the encoded information is examined and the identity of the email determined in block 550, such as by extracting a message identifier from the URL. Then the current reputation of the email may be determined in block 560, by querying a local database or a reputation server 120. As shown in FIG. 1, this querying may be performed by the web gateway 140 requesting the email gateway 110 to perform the reputation check, passing the email gateway 110 the message identifier or other email identification information, allowing the email gateway 110 to obtain the necessary reputation information data for use in requesting a reputation of the email from the reputation server 120. Once obtained by the email gateway 110, in such a system the reputation is returned to the web gateway 140 for analysis.

The web gateway 140, having received or determined the current reputation of the email in which the hyperlink was embedded, which may have changed since the original reputation of the email was considered by the email gateway 110, determines in block 570 whether to reject the traversal of the hyperlink. If the traversal if not rejected, then in block 580 the web gateway may redirect the traversal request to the destination of the hyperlink indicated by the URL. In some implementations, the information encoded in the URL by the email gateway may be removed, returning the URL to its original state prior to passing it in an HTTP or HTTPS request to the destination, to ensure the integrity of the traversal.

FIG. 6 is a flowchart illustrating a portion of the technique that is performed by the web gateway 140 upon receipt of content from the destination of the hyperlink. In block 610, the content information is received. In block 620, if the traversal originated from an email, then in block 630 the content may be filtered adaptively, adapting the filtering based upon the current reputation of the email. In some implementations, the web gateway 140 may reobtain the reputation of the email at this point. The filtering may also be adapted based upon the current reputation of the URL.

The order of the steps performed in the flowcharts of FIG. 4-6 is illustrative and by way of example only, and other steps and ordering of steps may be used. For example, although described above as checking the URL reputation prior to checking the email reputation, the web gateway 140 may first perform the just-in-time email reputation check first, allowing information about the email to be used in the reputation check of the URL. In addition, although described in terms of reputation checking, as indicated in the discussion of FIG. 4, any desired form of security checking may be performed instead of or in addition to reputation checking.

Figure 7:
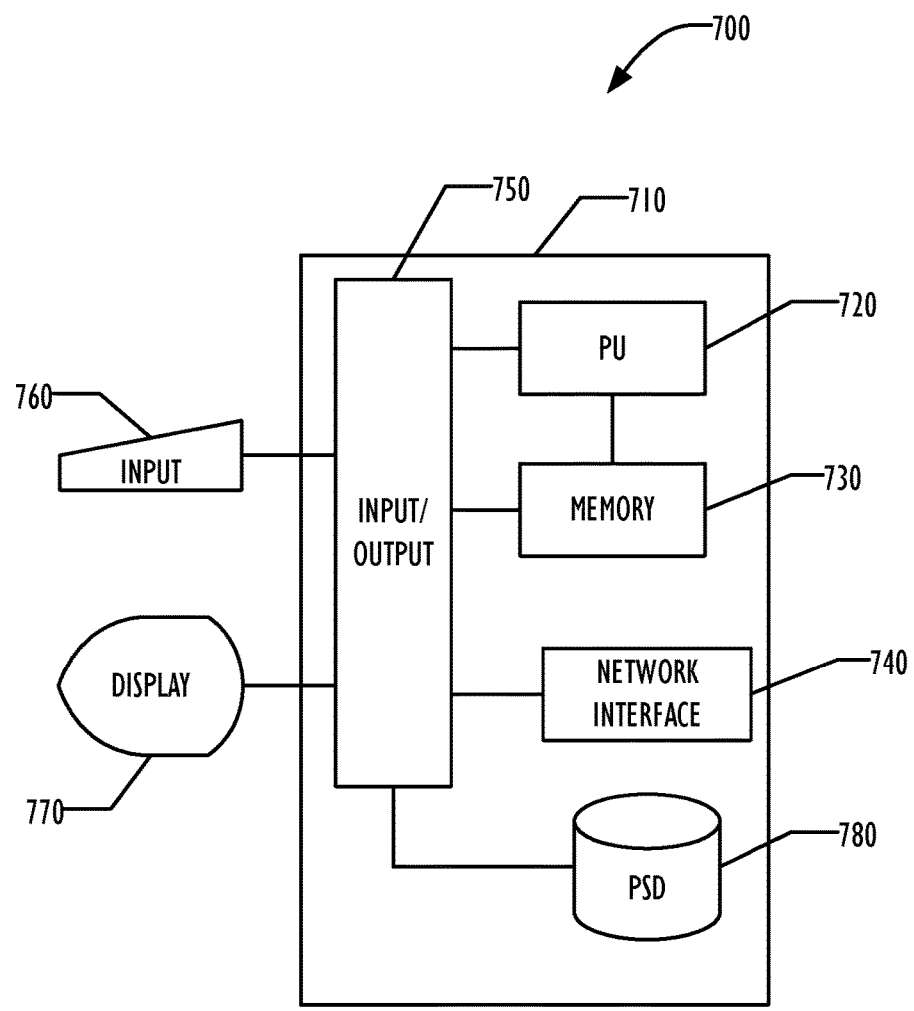
FIG. 7 is a block diagram illustrating a computing device for use with techniques described herein according to one embodiment.

Referring now to FIG. 7, an example computer 700 for use in providing an email gateway 110, client 130, web gateway 140, reputation server 120, and shortening service 360 is illustrated in block diagram form. Example computer 700 comprises a system unit 710 which may be optionally connected to an input device or system 760 (e.g., keyboard, mouse, touch screen, etc.) and display 770. A program storage device (PSD) 780 (sometimes referred to as a hard disc) is included with the system unit 710. Also included with system unit 710 is a network interface 740 for communication via a network with other computing and corporate infrastructure devices (not shown). Network interface 740 may be included within system unit 710 or be external to system unit 710. In either case, system unit 710 is be communicatively coupled to network interface 740. Program storage device 780 represents any form of non-volatile storage including, but not limited to, all forms of optical and magnetic, including solid-state, storage elements, including removable media, and may be included within system unit 710 or be external to system unit 710. Program storage device 780 may be used for storage of software to control system unit 710, data for use by the computer 700, or both.

System unit 710 may be programmed to perform methods in accordance with this disclosure (an example of which is in FIGS. 4-5). System unit 710 comprises a processor unit (PU) 720, input-output (I/O) interface 750 and memory 730. Processing unit 720 may include any programmable controller device including one or more members of the processor families in common use in computers, including multi-core processors. Memory 730 may include one or more memory modules and comprise random access memory (RAM), read only memory (ROM), programmable read only memory (PROM), programmable read-write memory, and solid-state memory. One of ordinary skill in the art will also recognize that PU 720 may also include some internal memory including, for example, cache memory.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A program storage device, on which is stored instructions for determining whether to allow traversal of a hyperlink embedded in an email, comprising instructions that when executed by one or more processors causes an email gateway to:
    receive an email;
    create a message identifier for the email;

generate meta-information corresponding to the email;
store the meta-information in a database, keyed by the message identifier;
encrypt the message identifier;
modify a resource locator of a hyperlink contained in the email to include the encrypted message identifier;
deliver the email to a recipient mailbox;
receive the message identifier from a web gateway;
determine a current reputation of the email from a reputation server; and
providing the current reputation of the email to the web gateway.

2. The program storage device of claim 1, wherein the meta-information comprises:
a data signature;
header data of the email; and
envelope data of the email.

3. The program storage device of claim 1, wherein the instructions for causing one or more processors to modify the resource locator comprise instructions for causing one or more processors to:
encode the message identifier into the resource locator.

4. The program storage device of claim 3, wherein the instructions for causing one or more processors to encode the message identifier into the resource locator comprise instructions for causing one or more processors to:
encode additional information into the resource locator.

5. The program storage device of claim 1, wherein the instructions for causing one or more processors to modify the resource locator comprise instructions for causing one or more processors to:
replace the resource locator with a different resource locator.

6. The program storage device of claim 1, wherein the instructions for causing one or more processors to modify the resource locator comprise instructions for causing one or more processors to:
encode information regarding a context of the email into the resource locator.

7. A system for determining whether to allow traversal of a hyperlink embedded in an email, comprising:
a web gateway; and
an email gateway,
wherein the web gateway comprises:
a processor;
a storage device, coupled to the processor, on which is stored software comprising instructions for causing the processor to:
receive a request to make a connection to a location specified by a resource locator of a hyperlink embedded in an email;
determine an identity of the email based on the resource locator;
determine a current reputation of the email; and
determine a current reputation of the resource locator; and
perform an action responsive to a reputation of the resource locator and the email,
wherein the email gateway comprises:
a processor;
a storage device, coupled to the processor, on which is stored software comprising instructions for causing the processor to:
receive the email; and
modify the resource locator in the email to identify the email.

8. The system of claim 7, wherein the software of the email gateway further comprises instructions for causing the processor to:
cache information corresponding to the email;
receive the request from the web gateway;
extract information about the email from the cached information based on information in the request;
obtain reputation information for the email; and
send the reputation information to the web gateway.

9. The system of claim 7,
wherein the software of the web gateway further comprises instructions for causing the processor to:
determine that the resource locator comprises information associated with a context of the email,
wherein the instructions for causing the processor to request reputation information comprise instructions for causing the processor to:
include the information associated with the context of the email in the request.

10. The system of claim 7,
wherein the software of the email gateway further comprises instructions for causing the processor to:
deliver the email containing the modified resource locator.

11. The system of claim 7, wherein the instructions for causing the processor to modify the resource locator comprise instructions for causing the processor to:
generate a message identifier for the email; and
modify the email by encoding the message identifier into the resource locator in the email.

12. The system of claim 7, wherein the software of the email gateway further comprises instructions for causing the processor to:
obtain an initial reputation of the email upon receipt of the email; and
perform an action responsive to the initial reputation.

13. The system of claim 7, further comprising:
a redirection server, comprising:
a processor; and
a storage device, coupled to the processor, on which is stored software comprising instructions for causing the processor to:
receive information associating the modified resource locator with the resource locator in the email;
receive a connection corresponding to the resource locator;
request a reputation of the email and the resource locator in the email; and
redirect the connection to a destination specified in the resource locator in the email,
wherein the instructions for causing the processor to modify the resource locator comprise instructions for causing the processor to:
replace the resource locator in the email with a resource locator pointing to the redirection server.

14. A method for determining whether to allow traversal of a hyperlink embedded in an email, comprising:
receiving an email by an email gateway computer, comprising:
determining an initial reputation of the email by requesting a reputation of the email from a reputation server;
modifying a first resource locator of a hyperlink embedded in the email to identify the email; and
deliver the email to a mailbox of a recipient; and receiving by the email gateway from a web gateway a request to traverse the first resource locator, comprising:
  determining a current reputation of the first resource locator by requesting a current reputation of the first resource locator from the reputation server;
  analyzing the first resource locator to identify the email in which the hyperlink was embedded;
  determining a current reputation of the email by requesting a current reputation of the email from the reputation server; and
  providing the current reputation of the first resource locator and the current reputation of the email to a web gateway for determining whether to allow traversal of the first resource locator.

15. The method of claim 14, wherein modifying a first resource locator comprises:
  replacing the resource locator with a second resource locator; and
  associating the first resource locator with the second resource locator.

16. The method of claim 15, wherein receiving a request to traverse the first resource locator further comprises:
  receiving a request by a redirection service to traverse the second resource locator; and
  determine the first resource locator associated with the second resource locator.

17. The method of claim 14,
  wherein receiving an email further comprises:
    storing meta-information about the email; and
    associating the meta-information with a message identification data, and
  wherein modifying a first resource locator comprises:
    encoding the message identification data into the first resource locator.

18. The method of claim 17, wherein the meta-information comprises:
  a data signature;
  header data of the email; and
  envelope data of the email.

19. The method of claim 14, wherein modifying a first resource locator of a hyperlink embedded in the email to identify the email comprises:
  encoding information regarding a context of the email into the resource locator.

20. The method of claim 14, wherein modifying a first resource locator of a hyperlink embedded in the email to identify the email comprises:
  replacing the resource locator with a difference resource locator.

* * * * *